United States Patent
Meyer et al.

(10) Patent No.: US 9,561,804 B2
(45) Date of Patent: Feb. 7, 2017

(54) DISTANCE TO EMPTY PREDICTION WITH SHORT TERM DISTANCE COMPENSATION

(71) Applicant: Ford Global Technologies, LLC, Dearborn, MI (US)

(72) Inventors: Jason Meyer, Canton, MI (US); Sangeetha Sangameswaran, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 14/309,006

(22) Filed: Jun. 19, 2014

(65) Prior Publication Data

US 2015/0367856 A1 Dec. 24, 2015

(51) Int. Cl.
| | |
|---|---|
| G06F 19/00 | (2011.01) |
| G06G 7/70 | (2006.01) |
| G06G 7/76 | (2006.01) |
| B60W 40/12 | (2012.01) |
| B60L 11/18 | (2006.01) |
| G07C 5/08 | (2006.01) |

(52) U.S. Cl.
CPC ........... *B60W 40/12* (2013.01); *B60L 11/1861* (2013.01); *G07C 5/08* (2013.01); *Y02T 10/7005* (2013.01); *Y02T 10/7077* (2013.01); *Y02T 10/84* (2013.01)

(58) Field of Classification Search
CPC ..... G01C 21/36; G01C 21/3469; G06F 19/00; B60W 40/12; B60L 11/1861; Y02T 10/7077
USPC ............................ 701/29.1, 123; 123/339.16
See application file for complete search history.

(56) References Cited

U.S. PATENT DOCUMENTS

| | | | |
|---|---|---|---|
| 8,406,948 B2 | 3/2013 | Wang et al. | |
| 2006/0180362 A1* | 8/2006 | Yamaguchi | B60K 6/445 180/65.235 |
| 2010/0010732 A1* | 1/2010 | Hartman | G01C 21/3484 701/532 |
| 2013/0158758 A1 | 6/2013 | Kim | |
| 2013/0166123 A1 | 6/2013 | Donald, III et al. | |
| 2013/0253740 A1 | 9/2013 | Kim | |
| 2013/0304380 A1 | 11/2013 | MacNeille et al. | |

(Continued)

FOREIGN PATENT DOCUMENTS

| | | | | |
|---|---|---|---|---|
| WO | 2013126263 A3 | 8/2013 | | |
| WO | WO 2013126263 A2 * | 8/2013 | | B60L 3/12 |

*Primary Examiner* — Isaac Smith
(74) *Attorney, Agent, or Firm* — David B. Kelley; Brooks Kushman P.C.

(57) ABSTRACT

A vehicle is provided which may include an energy conversion device, an energy source to supply power to the energy conversion device, and at least one controller in communication with an interface. The controller may be programmed to output a distance to empty (DTE) to the interface based on conditions of vehicle components and the energy source compensated by a distance correction factor. The controller may further include a DTE prediction architecture including a feed-forward energy consumption estimator, an energy consumption learning filter, a distance compensator, and a DTE calculator. A method for estimating distance to empty for a vehicle is also provided which may output a DTE modified by a predicted DTE range loss selected to include a distance correction factor corresponding to and correcting for the noise factor.

18 Claims, 4 Drawing Sheets

(56) References Cited

U.S. PATENT DOCUMENTS

2013/0311016 A1 11/2013 Kim
2014/0156185 A1* 6/2014 Lange ................ G01C 21/3469
　　　　　　　　　　　　　　　　　　701/527

* cited by examiner

DISTANCE TO EMPTY PREDICTION WITH SHORT TERM DISTANCE COMPENSATION

TECHNICAL FIELD

This disclosure relates to distance to empty prediction calculations for vehicles including an energy conversion device such as an electric machine or engine.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) contain a traction battery, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells. Vehicles with one or more HV batteries may include a battery management system that measures and/or estimates values descriptive of the HV battery, vehicle components, and/or battery cell present operating conditions. The battery management system may also output information relating to the measurements and estimates to an interface.

SUMMARY

A method for estimating distance to empty for a vehicle includes, in response to detecting a noise factor affecting propulsive energy consumption during vehicle start, outputting by a controller a DTE modified by a predicted DTE range loss selected to include a distance correction factor corresponding to and correcting for the noise factor for a duration not exceeding a predicted duration of the noise factor. The DTE may be based on a nominal DTE modified by an amount of energy available in an energy source of the vehicle and a nominal energy consumption rate. The nominal energy consumption rate may be based on a current energy consumption rate, historical energy consumption, and a predicted change in energy consumption rate due to the noise factor. The noise factor may be energy consumption due to an increased viscosity of oil at a temperature less than approximately sixty degrees Fahrenheit. The distance correction factor may be based on a distance driven by the vehicle scaled by a ratio of the predicted DTE range loss to the predicted duration of the noise factor. The distance correction factor may be a remaining portion of the predicted DTE range loss which corresponds to an estimated remaining duration of the noise factor. The predicted duration may expire before the vehicle travels ten kilometers.

A vehicle includes an energy conversion device, an energy source to supply power to the energy conversion device, and at least one controller in communication with an interface. In response to detecting a noise factor affecting propulsive energy consumption of the vehicle during vehicle start, the controller is programmed to output a distance to empty (DTE) to the interface based on conditions of vehicle components and the energy source compensated by a distance correction factor applied for a distance not exceeding a predicted noise factor distance. The controller may further include a DTE prediction architecture including a feed-forward energy consumption estimator, an energy consumption learning filter, a distance compensator, and a DTE calculator. The DTE may be modified by a nominal DTE based on a nominal energy consumption rate of the vehicle. The nominal energy consumption rate may be based on a current energy consumption rate, historical energy consumption, and a predicted change in energy consumption rate due to the noise factor. The noise factor may be energy consumption due to an increased viscosity of oil at a temperature below approximately sixty degrees Fahrenheit. The noise factor may be energy consumption due to additional energy required to heat up a catalytic converter to a predetermined temperature. The energy source may be a fuel tank or a HV battery pack.

A vehicle traction battery system includes one or more vehicle components, a traction battery pack in communication with the vehicle components, one or more sensors to monitor the vehicle components and pack, and a controller. The controller is configured to receive input from the sensors, to detect one or more noise factors affecting propulsive energy consumption due to vehicle start based on the input, and to output a distance to empty (DTE) modified by a distance correction factor derived from the input and applied for a duration less than a predicted noise factor distance. The controller may further include a DTE prediction architecture including a feed-forward energy consumption estimator, an energy consumption learning filter, a distance compensator, and a DTE calculator. The distance correction factor may be decremented based on a distance driven by the vehicle and scaled by a ratio of a predicted DTE range loss and a predicted duration of the noise factor. The distance correction factor may be a remaining portion of a predicted DTE range loss corresponding to an estimated remaining duration of the noise factor. The DTE may be modified by a nominal DTE based on a nominal energy consumption rate. The nominal energy consumption rate may be based on a current energy consumption rate, historical energy consumption, and a predicted change in energy consumption rate due to the noise factor.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
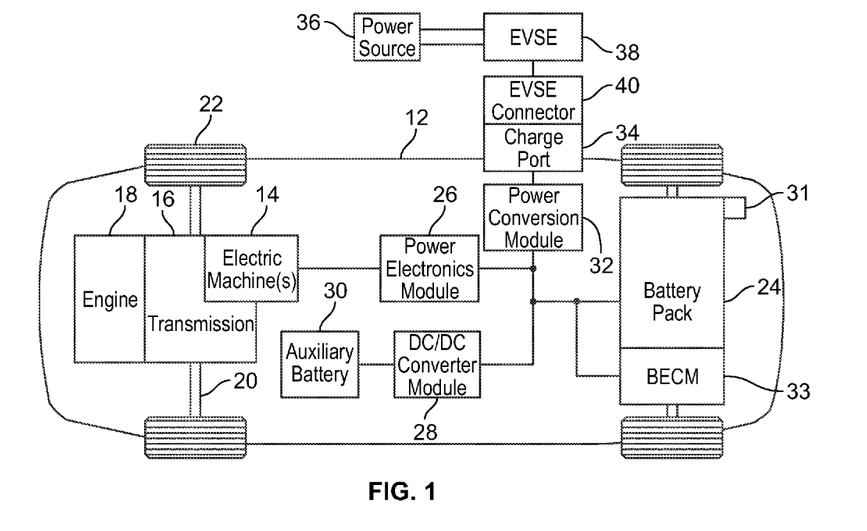
FIG. 1 is a schematic illustration of a battery electric vehicle.

FIG. 1 depicts a schematic of a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24.

The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells. The traction battery 24 may be heated and/or cooled using a liquid thermal management system, an air thermal management system, or other method as known in the art.

Accurately understanding energy consumption properties of various vehicle components is an integral part of estimating a distance to empty (DTE) range of vehicles having an energy conversion device, such as an engine or electric machine, and an energy source, such as a fuel tank or HV battery. In one example, DTE may be estimated based on a learned energy consumption rate and an amount of available energy. Multiple noise factors exist which may present challenges to estimating DTE under this approach. Some of these noise factors may change over an extended time scale while other noise factors may periodically change over a shorter time scale. Examples of noise factors may include vehicle mass/towing mass, vehicle condition which affects aerodynamic drag, tire characteristics, cabin temperature, climate control settings, coolant and oil temperature, ambient temperature, ambient pressure, precipitation, wind speed and direction, traffic, elevation, road grade, driving style, and braking habits.

Examples of noise factors which tend to change over an extended time scale include ambient temperature changes and tire deflation. Examples of noise factors which tend to periodically change over a shorter time scale include oil warm-up and cabin heating/cooling. Additionally, certain noise factors, such as elevation and posted speed limits, may change over an extended time scale or a shorter time scale. Energy consumption over a fixed time scale may be observed to learn the energy consumption efficiency. However, the above described approach may not distinguish between short-term fluctuations in energy consumption (which should be compensated but not projected forward) and longer term shifts in energy consumption (which should be projected forward to empty). If a time scale is too long, then an average effect of noise factors which tend to change over shorter time scales may be well captured, but the estimation may respond very slowly to noise factors which tend to change over extended time scales. Conversely, a short time scale may allow the estimation to adeptly capture the effects of noise factors which tend to vary over extended time scales, but the estimation may be susceptible to an over correction for noise factors which tend to change over shorter time scales. In either case, a common result may be an inaccurate estimation for DTE.

For example, an energy consumption rate for a vehicle during the first few minutes of a key on cycle or vehicle start may be greater, in certain circumstances as high as double, than the normal energy consumption rate of the vehicle. The above approach may over-predict DTE at the key on stage or vehicle start and then may over compensate for the observed high energy consumption rate which may result in underestimating DTE. Further, multiple short trips may cause the estimated DTE to oscillate such that a driver does not have clarity on the vehicle range. This type of inaccuracy may lead to driver dissatisfaction and particularly to drivers of BEVs and PHEVs.

Figure 2:
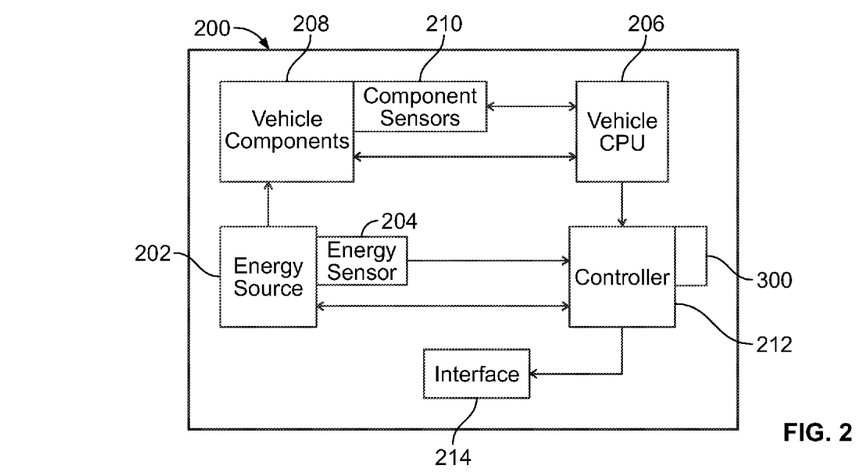
FIG. 2 is a block diagram illustrating an example of a vehicle.

FIG. 2 shows a vehicle 200 which may include an energy source 202. The vehicle 200 may be, for example, a BEV, PHEV, or a vehicle with a combustion engine. An energy sensor 204 may be in communication with the energy source 202, such as an HV battery pack or a fuel tank, to measure power levels of battery cells within the HV battery pack or a fuel level of the fuel tank. The energy sensor 204 for an HV battery pack may include a current sensor, a voltage sensor, and an accompanying battery control unit. The energy sensor 204 may be located in a suitable position including within, adjacent to, or proximate to the energy source 202. A vehicle computer processing unit ("CPU") 206 may be in communication with a plurality of vehicle components 208 and a plurality of component sensors 210 such that the CPU 206 may receive information regarding the vehicle components 208 and also direct operation thereof. Non-limiting examples of vehicle components 208 may include an engine, a transmission, a differential, an after treatment system, a lubrication system, electric machines, tires, a cabin climate control system, a battery pack thermal management system, an engine thermal management system, and an electric machine thermal management system. The component sensors 210 may include sensors appropriate to measure conditions of the corresponding vehicle component 208. For example, the energy sensor 204 may be a battery state of charge estimator. As another example in which the vehicle 200 includes an engine and fuel tank, the energy sensor 204 may be a fuel level sensor. A controller 212 may be in communication with the vehicle CPU 206, the energy sensor 204, and the energy source 202 to receive information relating to the vehicle components 208 and the energy source 202. The controller 212 may also be in communication with an interface 214 located in a cabin of the vehicle 200 to display and/or communicate information relating to the vehicle components 208 and the energy source 202.

Figure 3A:
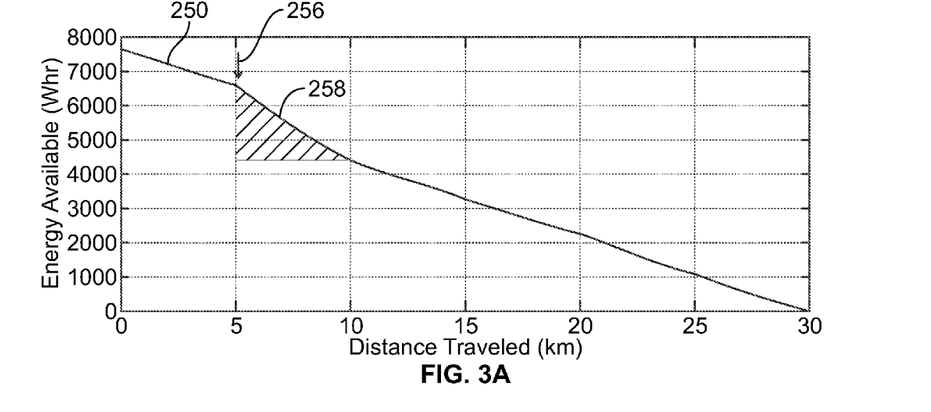
FIG. 3A is a graph illustrating an example of an energy consumption plot for the vehicle of FIG. 2.

FIG. 3A is a graph showing an example of an energy consumption plot 250 for the vehicle 200 over a distance represented by an x-axis. A y-axis represents available energy of the energy source 202. Arrow 256 indicates a location on the energy consumption plot 250 during which a key on cycle or vehicle start occurs. Zone 258 shows an example of the increase in energy consumption by the vehicle 200 as the vehicle 200 warms up from the key on cycle or vehicle start and shortly thereafter. This increase in energy consumption may be due to one or more transient noise factors such as oil warm-up and catalytic converter warm-up. The one or more transient noise factors may temporarily negatively affect propulsive energy consumption of the vehicle. For example, the transient noise factor affecting propulsive energy consumption of the vehicle may be due to an increased viscosity of oil when at a temperature less than approximately sixty degrees Fahrenheit.

Figure 3B:
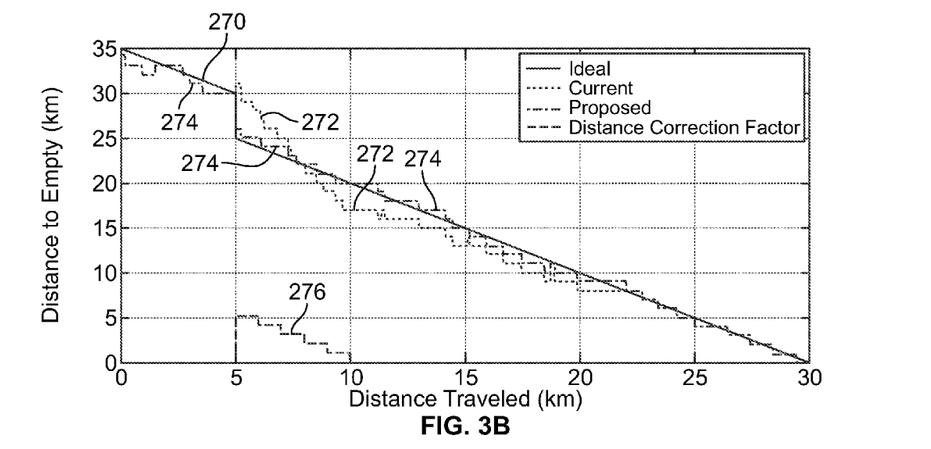
FIG. 3B is a graph illustrating examples of distance to empty plots for the vehicle of FIG. 2.

FIG. 3B is a graph showing examples of three DTE calculation plots and a distance correction factor. An illustrative DTE plot 270 may be a plot representing a theoretical DTE defined by a decrement rate of 1 km per 1 km of distance traveled during a drive cycle of the vehicle 200. The illustrative DTE plot 270 may be used as a baseline to compare examples of outputs of DTE calculations. A DTE without distance correction plot 272 is shown which may represent DTE calculations taken without utilizing a distance correction factor. For example, the DTE without distance correction plot 272 may be based on a learned energy consumption rate of the vehicle 200, however the learned energy consumption rate used in the DTE calculations may not accurately account for the different types of noise factors. Referring to x-axis values 5 km to 10 km, the DTE without distance correction plot 272 is shown to decrement a rate higher than 1 km per 1 km driven during warm-up (from approximately 5 km to 8 km) and overshooting the illustrative DTE plot 270 following warm-up (from approximately 8 km to 10 km). This undershooting and overshooting may result in inaccurate DTE information output to the interface 214 due to inaccurate compensation for the noise factors during warm-up.

A distance correction factor plot 276 shows an input which may assist in compensating for the transient noise factors. For example, a DTE with distance correction plot 274 may represent an application of a feed-forward compensation to noise factors identified as transient noise factors which (i) may be detected using component sensors 210, (ii) has an effect which may be predicted, (iii) affects the propulsive energy consumption rate of the vehicle 200, and (iv) is known to be transient and to eventually subside or disappear. One example of a noise factor which meets these criteria is the warm up-transients during a key on cycle or vehicle start as mentioned above. Compensating for this noise factor may provide a more accurate energy consumption efficiency estimate and thus positively impact DTE calculations. The distance correction factor plot 276 may represent a correction factor which may be based on a distance associated with a duration of the noise factor. In this example, the correction factor is approximately 4 km at the start of the key on cycle or vehicle start. As shown with the DTE with distance correction plot 274, utilizing the distance correction factor provides a DTE output much closer to the illustrative DTE plot 270.

Figure 4:
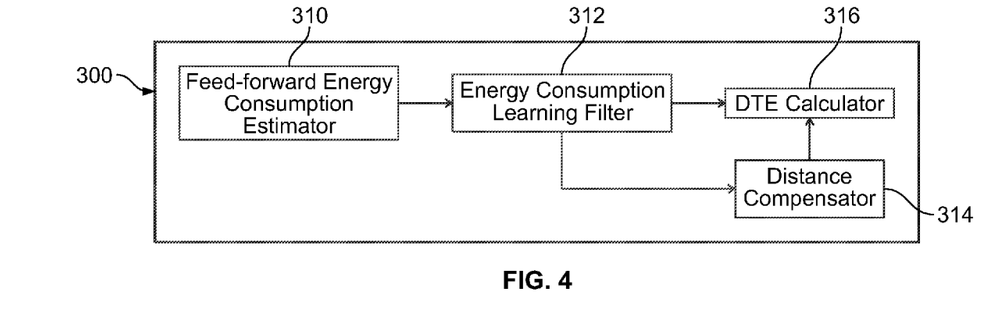
FIG. 4 is a block diagram of an example of a distance to empty prediction architecture for the vehicle of FIG. 2.

FIG. 4 shows one example of a DTE prediction architecture, referenced generally by numeral 300, which may include a feed-forward energy consumption estimator 310, an energy consumption learning filter 312, a distance compensator 314, and a DTE calculator 316. The DTE prediction architecture 300 may be in communication with the controller 212. The feed-forward energy consumption estimator 310 may include transfer function models for known and detectable short term noise factors. The transfer function models may each consider signals from the component sensors 210 relating to the according vehicle components 208 as inputs. Based on the inputs, the feed-forward energy consumption estimator 310 may output a predicted change in energy consumption rate (e.g. Whr/km or gallons/100 km) which may be an expected energy consumption effect of the respective noise factors. For example, a vehicle 200 warm-up noise factor condition in a conventional vehicle may be identified by measuring coolant temperature, oil temperature, engine head temperature, and/or catalyst temperature. A vehicle 200 warm-up condition may be identified by measuring tire pressure, the coolant temperature, and/or the oil temperature. If a warm-up cycle occurs, the energy consumption may be predicted to be higher than during the drive cycle following the warm-up cycle, but then may be predicted to reach a nominal rate as the vehicle 200 warms up. The nominal rate may be a zero change in the energy consumption rate.

The energy consumption learning filter 312 may receive inputs different than that of previous energy consumption learning filters. For example, the energy consumption learning filter 312 may learn a long term energy consumption rate of the vehicle by filtering an input energy consumption rate. Rather than directly inputting only a current energy consumption rate, the predicted change in energy consumption rate from the feed-forward energy consumption estimator 310 is subtracted from a current energy consumption rate (e.g. Whr/km or gallons/100 km) prior to being input into the energy consumption learning filter 312. Thus, the energy consumption learning filter 312 tracks a theoretical energy consumption rate that would be achieved if all of the detectable short term noise factors were removed, i.e. a warmed vehicle 200 with the cabin at a desired temperature. The result may be referred to as a nominal energy consumption rate (Whr/km) which may be input into the DTE calculator 316.

The distance compensator 314 may calculate a predicted DTE range loss (km) which may account for one or more short term noise factors in terms of energy consumption and noise factor duration. A distance correction factor may be generated by the distance compensator 314 and may be included in the DTE calculations to compensate for these noise factors. At key on or vehicle start of a drive cycle, the distance compensator 314 may predict the duration of a transient noise factor and the energy loss that will result from the transient noise factor. The distance compensator 314 may also predict a decrement rate of the DTE change (km/km) of the noise factor based on the ratio of the predicted DTE range loss and the predicted noise factor duration (km). During the drive cycle, the predicted DTE range loss of a noise factor may be decremented by the decrement rate. The distance compensator 314 may calculate the total predicted DTE range loss as the summation of the predicted DTE range loss of one or more noise factors.

For an electrified vehicle, such as a BEV or PHEV, the DTE calculator 316 may calculate an amount of energy available (Whr) in the battery pack based on one or more signals received from the energy sensor 204. For a conventional vehicle, the DTE calculator may calculate an amount of energy available in terms of fuel volume (gallons) in the fuel tank based on a fuel level sensor. The DTE calculator 316 may then calculate a nominal DTE (km) based on the energy available and the nominal energy consumption rate received from the energy consumption learning filter 312. The DTE calculator 316 may then calculate a modified DTE (km) based on the nominal DTE and the predicted DTE range loss due to the transient noise factor. This DTE may be modified by a distance correction factor derived from input from the component sensors 210 and applied for a duration less than a predicted noise factor distance. The DTE may also be based on conditions of the vehicle components 208 and the energy source 202 compensated by a distance correction factor applied for a distance not exceeding the predicted noise factor distance.

Figure 5:
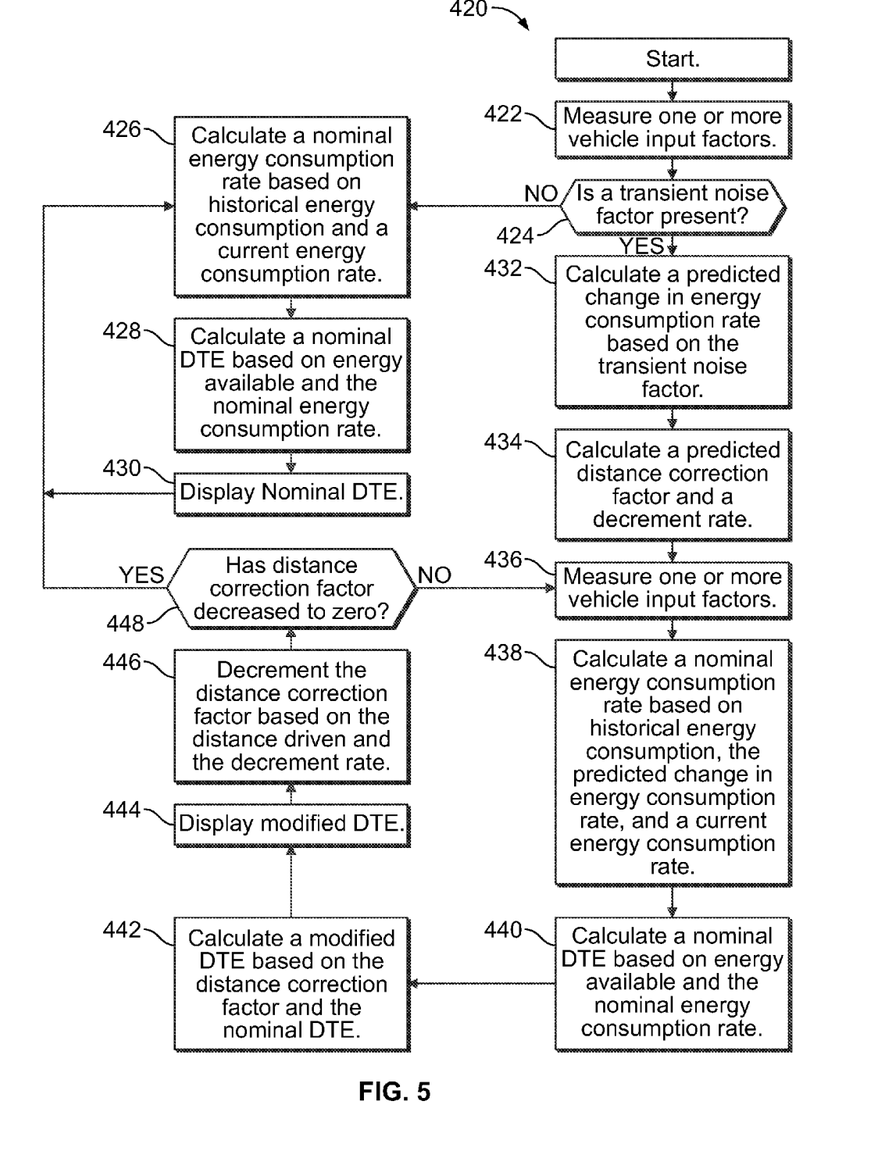
FIG. 5 is a flow chart illustrating an example of an algorithm for operation of the distance to empty prediction architecture from FIG. 4.

FIG. 5 shows an example of an algorithm for calculating a modified DTE for a vehicle which may compensate for transient noise factors. The algorithm is generally indicated by reference numeral 420. In operation 422, one or more sensors may measure one or more input factors and input the measurements into a feed-forward energy consumption estimator. As described above, various input factors may be measured. Under certain conditions, estimated values may be used as input factors such as tire temperature or combustion efficiency. If a controller does not detect a transient noise factor in operation 424, in operation 426 an energy consumption learning filter may calculate a nominal energy consumption rate based on historical energy consumption of the vehicle and a current energy consumption rate based on the input factors. In operation 428, a DTE calculator may calculate a nominal DTE based on energy available and the energy consumption rate calculated in operation 426. In operation 430, the controller may direct output of the nominal DTE on an interface and then repeat operations 426, 428, and 430 which may be based on newly measured input factors and/or estimated input factors.

If the controller detects a transient noise factor in operation 424, such as one or more transient noise factors related to vehicle warm-up, the energy consumption learning filter may calculate a predicted change in energy consumption rate based on the transient noise factor in operation 432. Optionally, additional measurements of the input factors may be used in operation 432 and/or estimated input factors such as tire temperature or combustion efficiency. In operation 432, the feed-forward energy consumption estimator may calculate a predicted change in an energy consumption rate (e.g. Whr/km or gallons/100 km) for the vehicle based on the transient noise factor detected in operation 424. In operation 434, a distance compensator may calculate a predicted distance correction factor and a decrement rate. Under certain conditions, the one or more sensors may update the input factor measurements in operation 436. One example of a condition is the activation or deactivation of the climate control system. In operation 438, a nominal energy consumption rate (e.g. Whr/km or gallons/100 km) may be calculated by an energy consumption learning filter based on historical energy consumption, the predicted change in energy consumption rate, and a current energy consumption rate (e.g. Whr/km or gallons/100 km). The current energy consumption rate may be based on an energy output rate of an energy source relative to a distance. In operation 440, a nominal DTE (km) may be calculated by the DTE calculator based on an amount of energy available (e.g. Whr or gallons) and the nominal energy consumption rate.

In operation 442, the DTE calculator may calculate a modified DTE based on the distance correction factor and the nominal DTE. In operation 444, the controller may direct output of the modified DTE on an interface. As described above, this modified DTE may compensate for one or more transient noise factors based on the distance correction factor. The distance compensator may decrement the distance correction factor based on the distance driven by the vehicle and the decrement rate in operation 446. In operation 448, the controller may repeat operation 436 and subsequent operations if the controller detects that the distance correction factor has not decreased to zero. If the controller detects that the distance correction factor has decreased to zero, the controller may direct operations 426, 428, and 430 to be repeated.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A method for estimating distance to empty (DTE) for a vehicle comprising:
    in response to detecting a noise factor affecting propulsive energy consumption during vehicle start, outputting by a controller a DTE modified by a predicted DTE range loss selected to include a distance correction factor decremented based on a distance driven by the vehicle and a ratio of the predicted DTE range loss to a predicted duration of the noise factor.

2. The method of claim 1, wherein the DTE is based on a nominal DTE modified by an amount of energy available in an energy source of the vehicle and a nominal energy consumption rate.

3. The method of claim 2, wherein the nominal energy consumption rate is based on a current energy consumption rate, historical energy consumption, and a predicted change in energy consumption rate due to the noise factor.

4. The method of claim 3, wherein the noise factor is an amount of energy consumption due to an increased viscosity of oil at a temperature less than approximately sixty degrees Fahrenheit.

5. The method of claim 1, wherein the distance correction factor is a remaining portion of the predicted DTE range loss which corresponds to an estimated remaining duration of the noise factor.

6. The method of claim 1, wherein the predicted duration expires before the vehicle travels ten kilometers.

7. A vehicle comprising:
    an energy conversion device;
    an energy source to supply power to the energy conversion device; and
    at least one controller in communication with an interface and programmed to, in response to detecting a noise factor affecting propulsive energy consumption of the vehicle during vehicle start, output a distance to empty (DTE) to the interface based on conditions of vehicle components and the energy source compensated by a distance correction factor applied for a distance not exceeding a predicted noise factor distance, decremented based on a distance driven by the vehicle and a ratio of a predicted DTE range loss and a predicted duration of the noise factor.

8. The vehicle of claim 7, wherein the controller further comprises a DTE prediction architecture including a feed-forward energy consumption estimator, an energy consumption learning filter, a distance compensator, and a DTE calculator.

9. The vehicle of claim 7, wherein the DTE is modified by a nominal DTE based on a nominal energy consumption rate of the vehicle.

10. The vehicle of claim 9, wherein the nominal energy consumption rate is based on a current energy consumption rate, historical energy consumption, and a predicted change in energy consumption rate due to the noise factor.

11. The vehicle of claim 7, wherein the noise factor is energy consumption due to a viscosity of oil at a temperature below approximately sixty degrees Fahrenheit as measured by a sensor.

12. The vehicle of claim 7, wherein the noise factor is an amount of energy consumption due to additional energy required to heat up a catalytic converter to a predetermined temperature.

13. The vehicle of claim 7, wherein the energy source is a fuel tank or a HV battery pack.

14. A vehicle traction battery system comprising:
    one or more vehicle components;
    a traction battery pack in communication with the vehicle components;
    one or more sensors to monitor the vehicle components and pack; and
    a controller configured to receive input from the sensors, to detect one or more noise factors affecting propulsive energy consumption due to vehicle start based on the input, and to output a distance to empty (DTE) modified by a distance correction factor derived from the input and applied for a duration less than a predicted noise factor distance, decremented based on a distance driven by the vehicle and a ratio of a predicted DTE range loss and a predicted duration of the noise factor.

15. The system of claim 14, wherein the controller further comprises a DTE prediction architecture including a feed-forward energy consumption estimator, an energy consumption learning filter, a distance compensator, and a DTE calculator.

16. The system of claim 14, wherein the distance correction factor is a remaining portion of a predicted DTE range loss corresponding to an estimated remaining duration of the noise factor.

17. The system of claim 14, wherein the DTE is modified by a nominal DTE based on a nominal energy consumption rate.

18. The system of claim 17, wherein the nominal energy consumption rate is based on a current energy consumption rate, historical energy consumption, and a predicted change in energy consumption rate due to the noise factor.

* * * * *